N. LEZAT.
Straw Cutter.
No. 45,376. Patented Dec. 6, 1864.
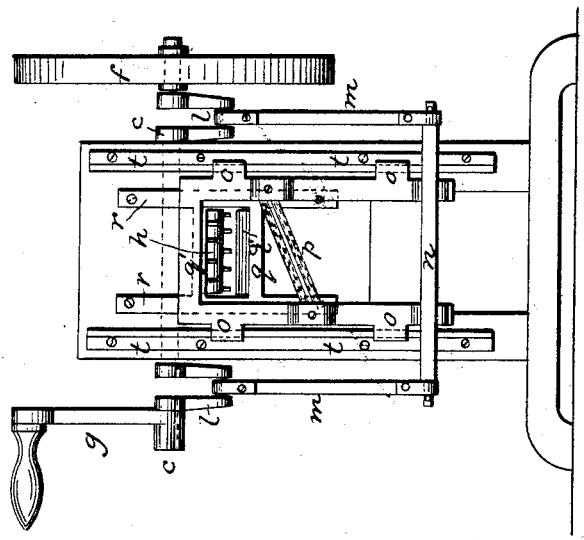
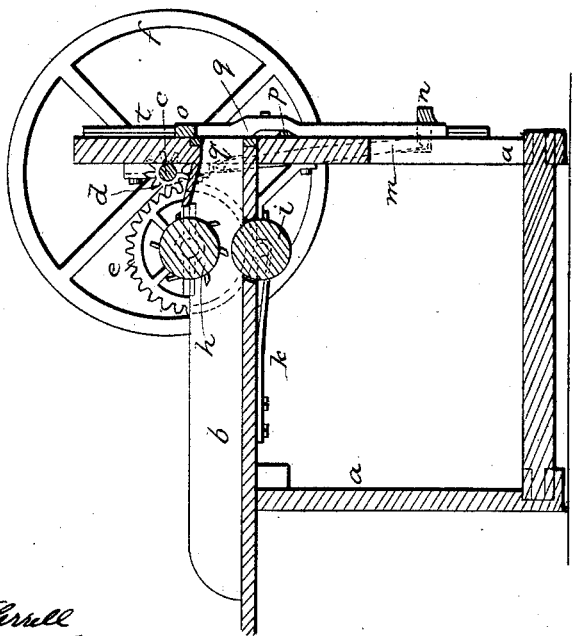
Attest.
Inventor.

UNITED STATES PATENT OFFICE.

NELSON LEZAT, OF NEW BALTIMORE, NEW YORK, ASSIGNOR TO HIMSELF AND EGBERT M. PALMER, OF SAME PLACE.

IMPROVEMENT IN STRAW-CUTTERS.

Specification forming part of Letters Patent No. 45,376, dated December 6, 1864.

*To all whom it may concern:*

Be it known that I, NELSON LEZAT, of New Baltimore, in the county of Greene and State of New York, have invented, made, and applied to use a certain new and useful Improvement in Straw-Cutters; and I do hereby declare the following to be a full, clear, and exact description of the said invention, reference being had to the annexed drawings, making part of this specification, wherein—

Figure 1 is a front elevation of my straw-cutter, and Fig. 2 is a longitudinal vertical section.

Similar letters denote the same parts.

Straw-cutters have heretofore been made with a two-edged knife acting against the edges of a vertical hopper.

The nature of my said invention consists in a two-edged cutting-knife, actuated by a peculiar arrangement of cranks and pitmen, in combination with feeding-rollers and with stationary bars or shears above and below the opening through which the straw passes, so that said straw is cut upward and then downward, so that any dust or grit that would injure the knife is shaken out of the straw, and the cutting operation is much more rapid than heretofore.

In the drawings, $a$ is the frame; $b$, the feeding-trough. $c$ is the main shaft over the feeding-trough, actuated by the crank $g$, and may have a fly-wheel, $f$, to render the rotation more uniform, or a pulley and belt may be used to rotate this shaft $c$. $d$ is a pinion to a wheel, $e$, driving the roller $h$, and $i$ is the lower roller on springs $k$, so that it will yield as the straw passes through. The rollers $h$ and $i$ are to be geared together, as usual.

$l\ l$ are cranks on the main shaft $c$, with pitmen $m\ m$, to a cross-bar, $n$, at the lower end of the frame $o$, carrying the knife $p$, and moving in slides $t$. This knife $p$ is made two-edged and set diagonally, so as to cut with a shearing cut against the stationary bars $q\ q'$, that are above and below the opening through which the straw is protruded by the action of the rollers $h$ and $i$. These bars $q\ q'$ are sustained by or formed with the bars $r$, that the knife-ends touch upon as the frame $o$ is slid up and down.

This arrangement of the cranks $l\ l$ and pitmen $m\ m$, in connection with the sliding frame $o$, carrying the knife, is very compact, and the straw-cutter is durable and can be actuated with but little power.

What I claim, and desire to secure by Letters Patent, is—

The reciprocating two-edged knife, actuated by the cranks in the manner specified, in combination with the feeding-rollers $h$ and $i$, and with the bars or standing-shears above and below the opening through which the straw or similar material is protruded, as and for the purposes set forth.

In witness whereof I have hereunto set my signature this 7th day of June, A. D. 1864.

<div style="text-align:right">
his<br>
NELSON × LEZAT.<br>
mark.
</div>

Witnesses:
 LEMUEL W. SERRELL,
 THOS. GEO. HAROLD.